(12) United States Patent
Chang

(10) Patent No.: US 9,672,179 B2
(45) Date of Patent: Jun. 6, 2017

(54) EXTERNAL DISPLAY SYSTEM FOR DISPLAYING DATA AND VISUALS OF AN INPUT OPERATING INTERFACE

(71) Applicant: DEXIN CORPORATION, New Taipei (TW)

(72) Inventor: Yuan-Jung Chang, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 309 days.

(21) Appl. No.: 14/494,853

(22) Filed: Sep. 24, 2014

(65) Prior Publication Data
US 2015/0012673 A1 Jan. 8, 2015

Related U.S. Application Data

(63) Continuation-in-part of application No. 13/183,432, filed on Jul. 15, 2011, now abandoned.

(51) Int. Cl.
| | |
|---|---|
| G06F 3/00 | (2006.01) |
| G06F 13/12 | (2006.01) |
| G06F 13/38 | (2006.01) |
| G06F 13/00 | (2006.01) |
| G06F 13/40 | (2006.01) |
| G06F 11/30 | (2006.01) |
| G06F 3/038 | (2013.01) |

(Continued)

(52) U.S. Cl.
CPC .......... *G06F 13/385* (2013.01); *G06F 3/0383* (2013.01); *G06F 3/03543* (2013.01); *G06F 3/1423* (2013.01); *G06F 11/3003* (2013.01); *G06F 13/4022* (2013.01); *G06F 2203/0384* (2013.01); *G09G 2340/0407* (2013.01); *G09G 2340/14* (2013.01); *G09G 2370/12* (2013.01); *G09G 2370/14* (2013.01); *G09G 2370/16* (2013.01)

(58) Field of Classification Search
CPC ..... G06F 1/1656; G06F 3/0317; G06F 3/0487
USPC .......................... 710/19, 1, 67, 72, 109, 316
See application file for complete search history.

(56) References Cited

U.S. PATENT DOCUMENTS

2004/0017333 A1* 1/2004 Cooper ................ G06F 3/1454 345/3.1
2006/0007151 A1* 1/2006 Ram ................... G06F 3/03543 345/163

(Continued)

*Primary Examiner* — Idriss N Alrobaye
*Assistant Examiner* — Getente A Yimer
(74) *Attorney, Agent, or Firm* — Chun-Ming Shih; HDLS IPR Services

(57) ABSTRACT

An external display system for displaying data of an input operating interface comprises: a computer module comprising a host, a display and a keyboard; a mouse module comprising a sensor unit, a first USB transmission interface unit, a control unit and a switch unit; an external display module comprising a second USB transmission interface unit, a microprocessor, a storage unit and a display unit. Upon receiving the triggering signal, the mouse module sends a signal to the microprocessor via the host. The microprocessor retrieves the status non-video data or the setting non-video data, generates and displays a status video data and/or a setting video data on the display unit. Or the microprocessor retrieves and transfers the setting non-video data to the host, and the host generates and transfers the setting video data to the display.

10 Claims, 4 Drawing Sheets

(51) Int. Cl.
*G06F 3/0354* (2013.01)
*G06F 3/14* (2006.01)

(56) References Cited

U.S. PATENT DOCUMENTS

| | | | |
|---|---|---|---|
| 2009/0142042 A1* | 6/2009 | Branam | H04N 21/4135 386/299 |
| 2010/0039435 A1* | 2/2010 | Chiang | G06F 1/1613 345/520 |
| 2012/0062800 A1* | 3/2012 | Sisto | G09G 5/006 348/660 |

* cited by examiner

EXTERNAL DISPLAY SYSTEM FOR DISPLAYING DATA AND VISUALS OF AN INPUT OPERATING INTERFACE

RELATED APPLICATIONS

This application is a Continuation-in-Part of U.S. patent application Ser. No. 13/183,432, filed on Jul. 15, 2011.

BACKGROUND OF THE INVENTION

Field of the Invention

The present invention relates to a display system, in particular, the present invention relates to an external display system for displaying data and visuals of an input operating interface.

Description of Prior Art

Nowadays, computers are critical work tools for modern people, job tasks are mostly accomplished by computation and control of computers.

In addition to the work places, computers are useful for entertaining purposes for example, playing computer games. Except for particular computer games using joysticks, most of computer games use an operation keyboard and a mouse for controlling game actions in playing computer games. In order to provide a quick reference of operation key settings and key locations to users during game playing, a sub display is offered in the main display of a computer game for displaying the operation key settings and the key locations. Such displaying method allows a user to get quick reference to the operation instructions without leaving the main frame or window of the computer game and go to the database of the game operation instructions. However, a sub display preoccupies the display space of the default display in a computer game and thus is inconvenient to a user when playing a game.

Under certain occasions, a mouse is set to perform special functions (such as performing functions of a set of hot keys replacing keyboard and mouse actions). In other occasions, a mouse is set to perform default and basic functions. The conversion in between is inconvenient to users.

In addition, users generally are allowed to access to parameter settings of the keyboard or the mouse via applications of the operating system of the computer, but users are not allowed to view or understand parameter setting usage status (such the data of the press count of certain key on the keyboard) of the keyboard and the mouse after using a keyboard and a mouse for a period of time with a computer. Without the information, a user does not have references in considering when to replace a keyboard and a mouse. Thus, it is also a disadvantage the present invention expects to resolve.

SUMMARY OF THE INVENTION

The objective of the invention is to overcome the disadvantages when using a traditional keyboards or mouse. The present invention provides an external display system for displaying data of operation instructions parameter setting values or visuals (pictures and images) etc. of computer games, graphic software, sensors etc., or displaying default parameter setting of a mouse module as well as a current parameter setting usage status of a mouse module or a keyboard after using for a period of time.

Another objective of the present invention is to provide an external display system installed with computer game data (comprising specific function hot keys for controlling actions).

In order to achieve the above objective, the present invention provides an external display system for displaying data of an input operating interface, comprising a computer module, a mouse module and an external display module.

The computer module comprises a host, a display and a keyboard. The host has a first USB connection port and a second USB connection port. The display is electrically coupled to the host. And the keyboard is electrically coupled to the host.

The mouse module comprises a sensor unit, a first USB transmission interface unit, a control unit and a switch unit. The sensor unit is configured to retrieve a status non-video data corresponding to current usage status of a mouse for controlling icon movement in the pictures displayed on the displayer. The first USB transmission interface unit is electrically coupled to the first USB connection port. The control unit is electrically coupled with the first USB transmission interface unit and the sensor unit, and processing the status non-video data, wherein the control unit further comprises a memory or an internal buffer for storing the status non-video data. And the switch unit is electrically coupled to the control unit for sending a triggering signal to the control unit.

The external display module electrically coupled with the host of the computer module, comprises a second USB transmission interface unit, a microprocessor, a storage unit and a display unit. The second USB transmission interface unit is electrically coupled with the host. The microprocessor is electrically coupled with the second USB transmission interface unit. The storage unit is electrically coupled with the microprocessor, the storage unit being preloaded or present with a setting non-video data corresponded to the parameters of the computer module or the mouse module. And the display unit electrically coupled with the microprocessor.

Preferably, upon receiving the triggering signal, the control unit triggers the first USB transmission interface unit to send a first signal to the host via the first USB connection port. In response to the first signal, the host sends a second signal to the microprocessor of the external display module for processing via the second USB connection port. In response to the second signal, the microprocessor retrieves the status non-video data from the control unit or the setting non-video data from the storage unit, generates a status video data and/or a setting video data according to the status non-video data and/or the setting non-video data, and display the status video data or the setting video data on the display unit of the external display module. Or the microprocessor retrieves the setting non-video data from the storage unit and transfers the setting non-video data to the host via the mouse module, and then the host of the computer module generates the setting video data according to the setting non-video data, and transfers the setting video data to the display for displaying.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

In cooperation with attached drawings, the technical contents and detailed description of the present invention are described thereinafter according to preferred embodiments, being not used to limit its executing scope. Any equivalent variation and modification made according to appended claims is all covered by the claims claimed by the present invention.

The term "video data" is a data consisted of the plurality of pictures or the plurality of image signals. The video data can be directly displayed on a display without any video-generated processing by directly display the pictures or the image signals. The video data can be NTSC (National Television Systems Committee) signals, PAL (Phase Alternation Line) signals HDTV (High Definition Television) signals, DVI (Digital Visual Interface) signals, VGA (Video Graphics Array) signals or video stream.

The term "non-video data" is a data excluding from the video data. The non-video data can't be directly displayed on a display. The non-video data can be the numbers, the words, the instructions or the programs. To display the non-video data (such as the words), a processor generates a video data according to the non-video data, and transfers the generated video-data to a display for rendering the content of the non-video data. In more detail, the processor generates the plurality of pictures or plurality of image signals, wherein the rendered content of the plurality of pictures or the plurality of image signals is same as the content of the non-video data.

Figure 1:
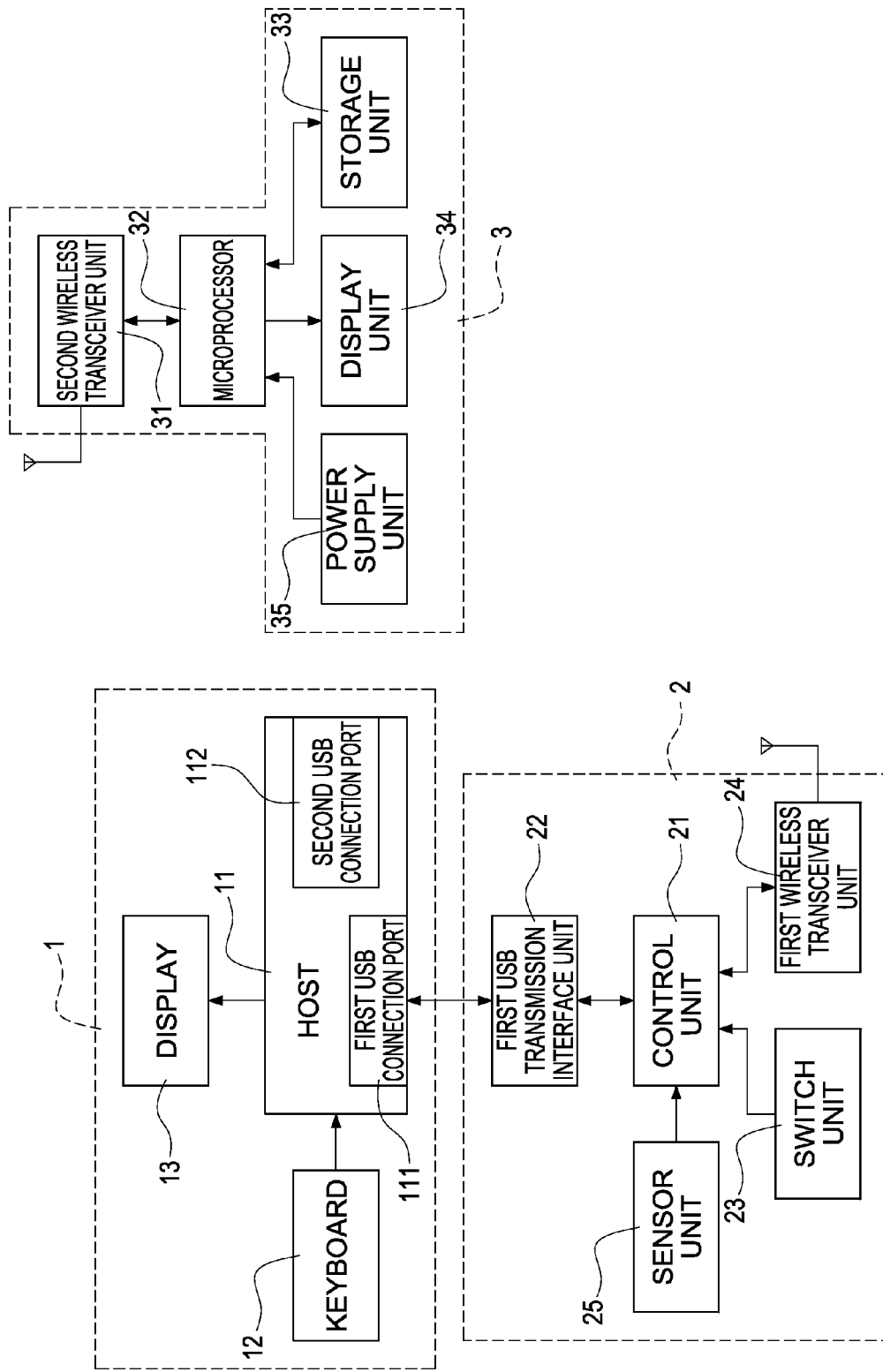
FIG. 1 is a schematic block diagram of an external display system for displaying data of an input operating interface according to the present invention.

FIG. 1 is a schematic block diagram of an external display system for displaying data of an input operating interface according to the present invention. As shown in the diagram, an external display system for displaying input operation interface settings data of the present invention comprises: a computer module 1, a mouse module 2 and a display module 3.

The computer module 1 at least comprises a host (computer motherboard) 11, a keyboard 12 electrically coupled with the host 11, a display 13 electrically coupled with the host 11. The host 11 has at least a first USB connection port 111 and a second USB connection port 112. In FIG. 1, the computer 1 is a desktop computer or a notebook computer.

The mouse module 2 has a control unit 21, a first USB transmission interface unit 22, a switch unit 23, a first wireless transceiver unit 24 and a sensor unit 25. The control unit 21 is electrically coupled with the first USB transmission interface unit 22, the switch unit 23 and the first wireless transceiver unit 24 (a radio frequency wireless receiver/transmitter or a Infrared transceiver). The mouse module 2 is electrically coupled with the first USB transmission interface unit 22 and the first USB connection port 111. The received signals and data by the mouse module 2 or a triggering signal generated by operating the switch unit 23 are processed by the control unit 21 and transferred via the first USB transmission interface unit 22 to the host 11 for computation and displayed on the display 13.

The first wireless transceiver unit 24 is used for transferring signals or data to the display module 3, or receiving signals or data transferred by the display module 3. In addition, a status non-video data corresponding to current usage status of the mouse module 2 is stored in an internal buffer or a memory in the control unit 21. For example, a data of a key press count, a roll count, an usage time length of the switch unit 23 of the mouse module 2. Further, the sensor unit 25 is configured to retrieve the status non-video data corresponding to current usage status of a mouse for controlling the icon movement in the pictures displayed on the display 13. In FIG. 1, the switch unit 23 comprises a left button, a right button and a wheel.

The display module 3 is electrically coupled via wireless transmission with the mouse module 2. The display module 3 includes: a second wireless transceiver unit 31 (a radio frequency wireless receiver/transmitter or an Infrared transceiver), a microprocessor 32, a storage unit 33, a display unit 34 and a power supply unit 35. The microprocessor 32 is electrically coupled with the second wireless transceiver unit 31, storage unit 33 and display unit 34 for receiving signals and data transferred from the first wireless transceiver unit 24. The received signals or data are processed by the microprocessor 32 and stored in the storage unit 33. Or the microprocessor 32 generates the video data according to the received data (if the received data is a non-video data) and transfers the video data to the display unit 34 for displaying.

Further, the storage unit 33 is preloaded or present in factory with a setting non-video data corresponded to the parameters of the computer module 1 or the mouse module 2.

Preferably, the setting non-video data comprises the operation key settings of a computer games, a software or the sensors, the default parameters of the mouse module 2 or the keyboard 12, the parameter setting values of the sensors, or the parameter setting usage status of the mouse module 2 or the keyboard 12 after using for a period of time.

Further, the power supply unit 35 is used for providing working power of each unit. The power supply unit 35 can be a battery or a USB plug to plug in the second USB connection port 112 of the computer module 1 in the host 11, whereby the host 11 provides the working power. In FIG. 1, the storage unit 33 is an Electrically-Erasable Programmable Read-Only Memory (EEPROM) or a Flash Memory. The display unit 34 is a LCD (Liquid Chrystal Display).

Figure 2:
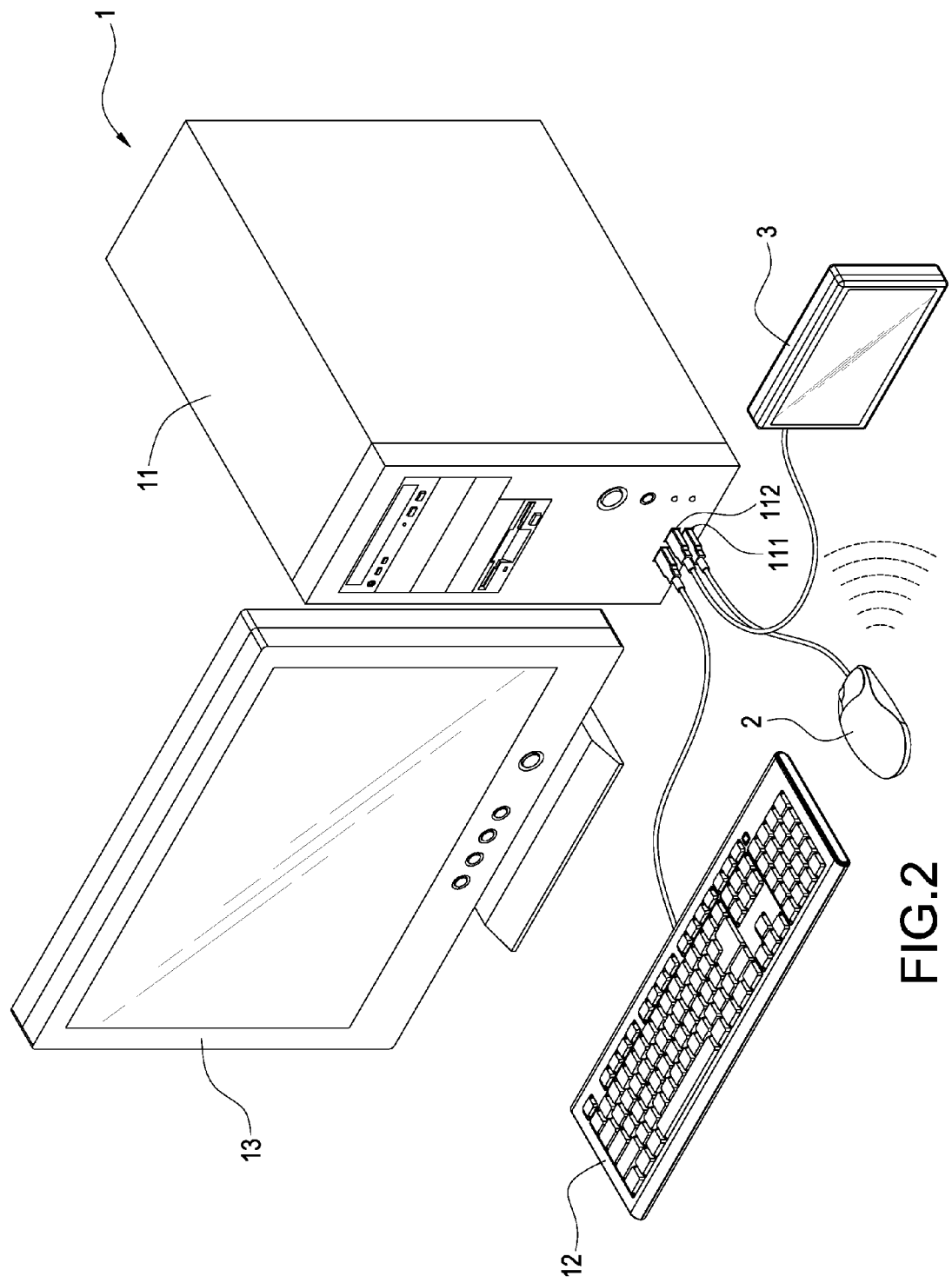
FIG. 2 is a schematic diagram illustrating usage status of a preferred embodiment according to the present invention.

Referring to FIG. 1 and FIG. 2, FIG. 1 is a schematic block diagram of an external display system for displaying data of an input operating interface according to the present invention and FIG. 2 is a schematic diagram illustrating usage status of a preferred embodiment according to the present invention. As shown in the diagram, the computer module 1, the mouse module 2 and the display module 3 are electrically coupled to perform operations.

In addition to the existed operation input of the keyboard 12 and the mouse module 2 on the computer module 1, when a user executing computer games in the computer module 1 and forget the corresponding relationship between a function and the key, such as operation keys settings (key locations) or default parameter setting value of the keyboard 12 or mouse module 2. A user presses switch unit 23 on the mouse module 2 to send the triggering signal to the control unit 21, the control unit 21 triggers the first wireless transceiver unit 24 to transfer a first signal to the display module 3. The second wireless transceiver unit 31 receives the first signal and transfers the first signals to the microprocessor 32 for retrieving the setting non-video data (such as operation key settings of the computer games) saved in the storage unit 33.

Then, the microprocessor 32 generates a setting video data according to the setting non-video data, and transfers the setting video data to the display unit 34 for displaying.

Or the setting non-video data are retrieved by the microprocessor 32 and transferred to the mouse module 2 via the second wireless transceiver unit 31. The setting non-video data is received by the first wireless transceiver unit 24 and transferred to the host 11 of the computer module 1 for computation via the control unit 21 and first USB transmission interface unit 22. Then the host 11 generates the setting video data according to the setting non-video data and transfers the setting video data to the display 13 for displaying the operation key setting of the computer games to give the user the required information quickly.

Further, if a user wants to obtain the status non-video data corresponding to current usage status of the mouse module 2, the user can press left or right button of the switch unit 23 to retrieves the status non-video data temporarily saved in the internal buffer or the memory of the control unit 21. The status non-video data is transferred to the display module 3 via the first wireless transceiver unit 24. After status non-video data is received by the second wireless transceiver unit 31 and processed by the microprocessor 32, the status non-video data is saved in the storage unit 33, or displayed on the display unit 34 by generating the status video data according to the status non-video data for displaying.

Further, a user is allowed to set the setting non-video data (such as operation keys settings of computer games) with the keyboard 12 and the mouse module 2 in the computer module 1, the set setting non-video data is transferred to the mouse module 2 via first USB transmission interface unit 22. Controlled by the control unit 21, the set setting non-video data are transformed to the wireless signals (such as radio frequency (RF) signal or infrared signal) and transferred to the display module 3 via the first wireless transceiver unit 24. The wireless signals are received by the second wireless transceiver unit 31, processed by the microprocessor 32 for transforming the wireless signals to the setting non-video data and saved it in the storage unit 33, or the microprocessor 32 generates the setting video data according to the setting non-video data and transfers the setting video data to the display unit 34 for displaying.

When the user wants to know the setting non-video data (such as operation keys data set in the last computer games), the user presses the switch unit 23 on the mouse module 2 for sending the triggering signal to the control unit 21. Upon receiving the triggering signal, the control unit 21 triggers the first wireless transceiver unit 24 to send the first signal to the display module 3. After the first signal are received by the second wireless transceiver unit 31 and processed by the microprocessor 32, the setting non-video data preset by the user and saved in the storage unit 33 is retrieved. The microprocessor 32 generates the setting video data according to the setting non-video data and transfers the setting video data to the display unit 34 for displaying the setting video data on the display unit 34. Or the setting non-video data saved in the storage unit 33 is retrieved by the microprocessor 32, transferred back to the mouse module 2 via the second wireless transceiver unit 31. The setting non-video data is received by the first wireless transceiver unit 24 and processed by the control unit 21, then transferred by first USB transmission interface unit 22 to the computer module 1. Then, the host 11 generates the setting video data according to the received setting non-video data and transfers the setting video data to the display 13 for displaying. Thus, the operation keys data of the computer games is displayed on the display 13.

Or, a user presses the left button (as hot keys) of the mouse module 2, the external display module 3 displays action control buttons such as CTRL-C, CTRL-V and CTRL-D for performing action control, a user select an action control item (such as CTRL-C), the action control signals is transferred to the host 11 for performing the selected action control.

Figure 3:
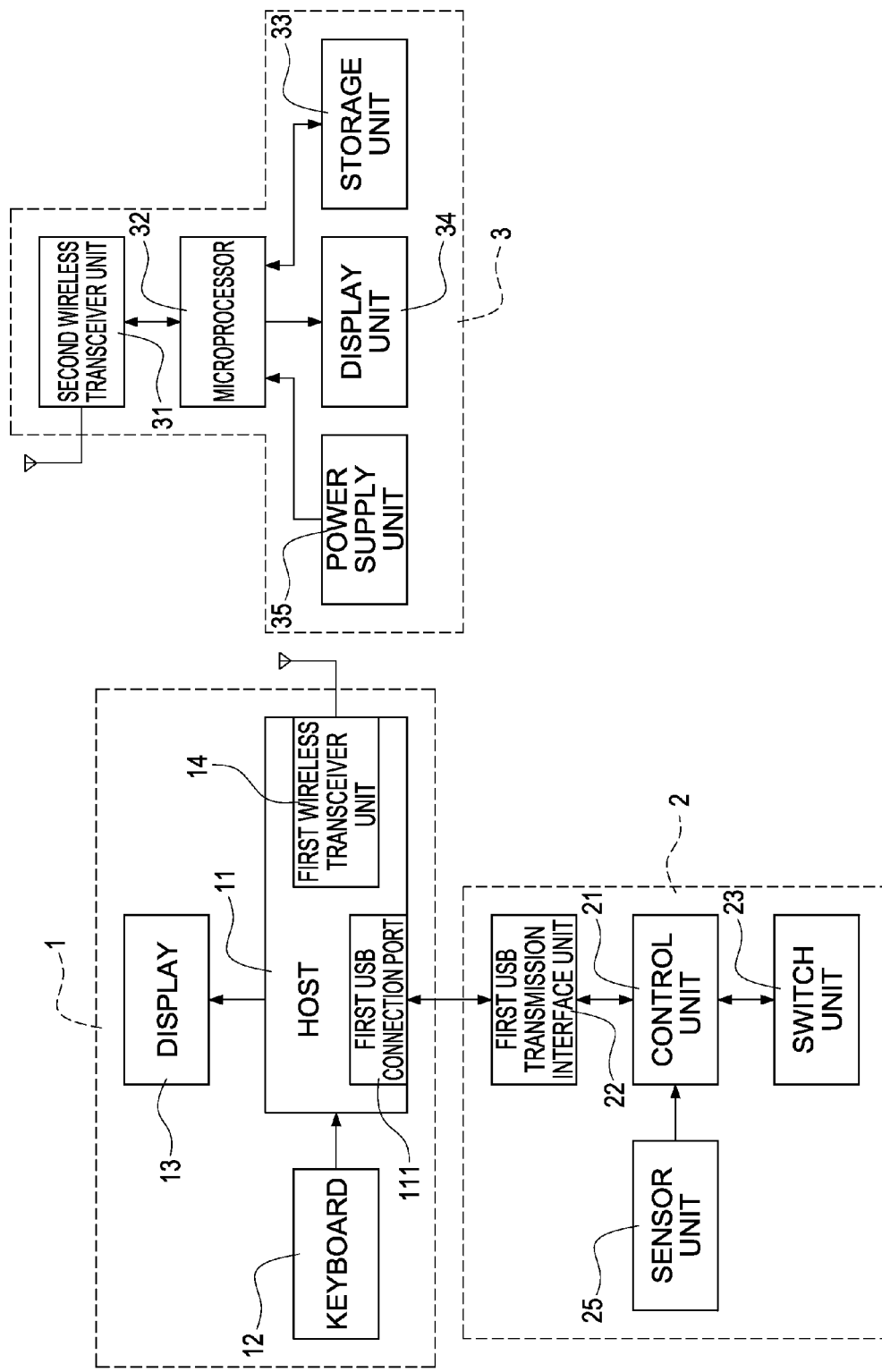
FIG. 3 is a schematic diagram of another preferred embodiment according to the present invention.

FIG. 3 is a schematic diagram of another preferred embodiment according to the present invention. As shown in the diagram, the embodiment is largely identical with the embodiment shown in the FIG. 2. The differences are that the first wireless transceiver unit 14 is installed in the host 11 of the computer module 1. When a user wants to access to the setting non-video data (such as operation keys of computer games or operation setting values) of the mouse module 2, the first wireless transceiver unit 14 transfers the first signal to the display module 3 after operating with the keyboard 12 or the mouse module 2. After the microprocessor 32 retrieves the internal setting non-video data in the storage unit 33, the microprocessor 32 generates the setting video data according to the setting non-video data (such as operation keys, visuals of computer games or the related setting values of the mouse module 2), and transfers the setting video data to the display unit 34 for displaying. Or, the microprocessor 32 retrieves the setting non-video data in the storage unit 33 (such as operation keys, visuals or related setting data of the mouse module 2) and transfers the setting non-video data directly to the host 11. The setting non-video data is received by the first wireless transceiver unit 14. The host 11 generates the setting video data according to the received setting non-video data, and transfers the setting video data to the display 13 for displaying.

A user is allowed to operate with the keyboard 12 and the mouse module 2 to transfer the status non-video data (such as usage status) temporarily saved in an internal buffer or a memory of the control unit 21 to the display module 3 via first wireless transceiver unit 14. The status non-video data is processed by the display module 3. Various status non-video data recorded after the mouse module 2 is used for a period of time (such as the key press count, the wheel roll count, usage time length of the mouse module) is processed for generating the status video data displayed on the display unit 34.

Figure 4:
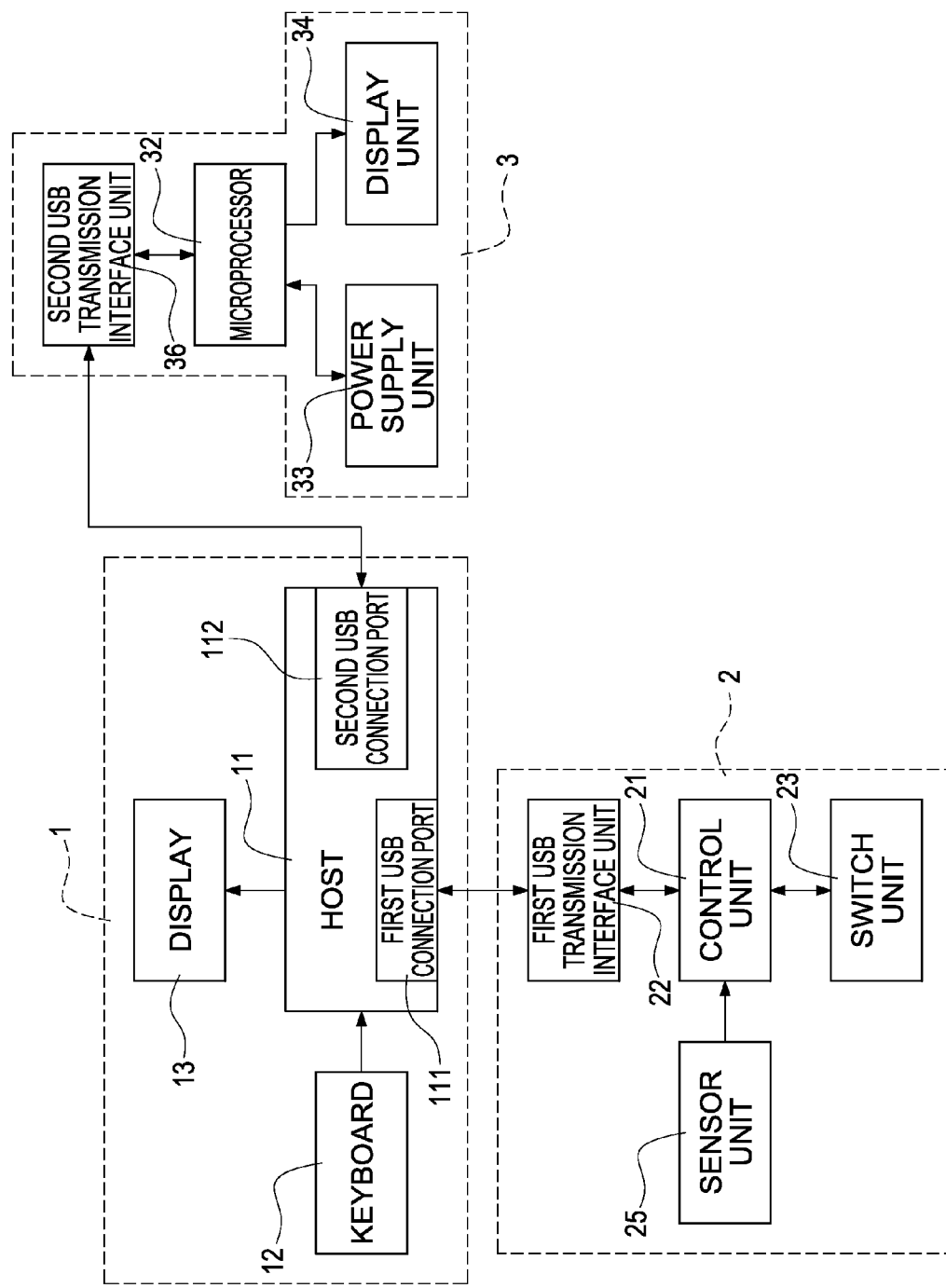
FIG. 4 is a schematic diagram of the other preferred embodiment according to the present invention.

FIG. 4 is a schematic diagram of the other preferred embodiment according to the present invention. As shown in the diagram, the display module 3 is installed with a second USB transmission interface unit 36 according to the embodiment to allow the display module 3 to plug in second USB connection port 112 of the host 11 with second USB transmission interface unit 36.

When an user wants to access the setting non-video data (such as operation keys or visuals of computer games, or operation setting values of the mouse module 2), the host 11 transfers signals via the second USB connection port 112 to the display module 3. After operating with the keyboard 12 or the mouse module 2, the microprocessor 32 retrieves internal setting non-video data in the storage unit 33, generates the setting video data according to the non-video data, and transfers the setting video data to the display unit 34 for displaying. Thus, this embodiment can display the operation keys or the visuals of the computer games, or the operation setting values of the mouse module 2 on the display unit 34.

Or, the microprocessor 32 retrieves the setting non-video data in storage unit 33 (such as the operation keys or the related setting values data of the mouse module 2). The second USB transmission interface unit 36 transfers the setting non-video data back to the host 11 to process. The host 11 generates the setting video data according to the received setting non-video data, and transfers the setting video data to the display 13. The setting video data transferred from the host 11 is displayed on the display 13.

Via operations of the keyboard 12 and the mouse module 2, a user is allowed to transfer the status non-video data temporarily saved in the internal buffer or the memory of the control unit 21 to the display module 3 via the second USB connection port 112. The status non-video data including various usage status (such as data of the key press count, the wheel roll count, the usage time length of the mouse module etc.) of the mouse module 2 is processed by the display module 3. Then the microprocessor 32 of the display module 3 generates the status video data according to the status non-video data, and displays the status video data on the display unit 34.

When the user wants to access the setting non-video data stored in the storage unit 33 of the display module 3, the user can press the switch unit 23 for sending the triggering signal to the control unit 21. Upon receiving the triggering signal, the control unit 21 triggers the first USB transmission interface unit 22 to send a first signal to the host 11 via the first USB connection port 111.

In response to the first signal, the host 11 sends a second signal to the microprocessor 32 of the external display module 3 for processing via the second USB connection port 112. In response to the second signal, the microprocessor 32 retrieves the status non-video data from the control unit 21 or the setting non-video data from the storage unit 33, and generates a status video data and/or a setting video data according to the status non-video data and/or the setting non-video data, and display the status video data or the setting video data on the display unit 34 of the external display module 3.

Or the microprocessor 32 retrieves the setting non-video data from the storage unit 33 and transfers the setting non-video data to the host 11 via the mouse module 2, and then the host 11 of the computer module 1 generates the setting video data according to the setting non-video data, and transfers the setting video data to the display 13 for displaying.

In other embodiment of the present invention, the display module 3 further comprises a scaler (not shown in the Fig.) electrically coupled the microprocessor 32 and the display unit 34. The scaler can transform a video data (such as setting video data or status video data) to a special display format data corresponded to a display format of the display unit 34 (such as LVDS (Low-Voltage Differential Signaling)).

For example, the scaler can change the resolution of the video data, and obtain the display format data with a special resolution corresponded to the resolution of the display unit 34.

In other embodiment of the present invention, when the user presses the left button (as hot keys) of the mouse module 2, the external display module 3 displays action control buttons such as CTRL-C, CTRL-V and CTRL-D for performing action control, a user select an action control item (such as CTRL-C), the action control signals is transferred to the host 11 for performing the selected action control.

As the skilled person will appreciate, various changes and modifications can be made to the described embodiments. It is intended to include all such variations, modifications and equivalents which fall within the scope of the invention, as defined in the accompanying claims.

What is claimed is:

1. An external display system for displaying data of an input operating interface, comprising:
   a computer module comprising:
      a host having a first USB connection port and a second USB connection port;
      a display electrically coupled to the host; and
      a keyboard electrically coupled to the host;
   a mouse module comprising:
      a sensor unit configured to retrieve a status non-video data comprising current usage status of a mouse for controlling icon movement in the pictures displayed on the displayer;
      a first USB transmission interface unit electrically coupled to the first USB connection port;
      a control unit electrically coupled with the first USB transmission interface unit and the sensor unit, and processing the status non-video data, wherein the control unit further comprises a memory or an internal buffer for storing the status non-video data; and
      a switch unit electrically coupled to the control unit and sending a triggering signal to the control unit when the switch unit being pressed; and
   an external display module electrically coupled with the host of the computer module, comprising:
      a second USB transmission interface unit electrically coupled with the host;
      a microprocessor electrically coupled with the second USB transmission interface unit;
      a storage unit electrically coupled with the microprocessor, the storage unit being preloaded or present with a setting non-video data comprising the parameters of the computer module or the mouse module; and
      a display unit electrically coupled with the microprocessor;
   wherein upon receiving the triggering signal, the control unit triggers the first USB transmission interface unit to send a first signal to the host via the first USB connection port;
   wherein in response to the first signal, the host sends a second signal to the microprocessor of the external display module for processing via the second USB connection port;
   wherein in response to the second signal, the microprocessor receives the status non-video data from the control unit and generates a status video data according to the status non-video data, and displays the status video data on the display unit of the external display module for rendering the current usage status of the mouse on the display unit, or receives the setting non-video data from the storage unit and generates a setting video data according to the setting non-video data, and displays the setting video data on the display unit of the external display module for rendering the parameters of the computer module or the mouse module on the display unit; and
   wherein the external display module displays the action control items respectively corresponding to different action controls when a hot key of the mouse module is pressed, and transfers an action control signal corresponding to the selected action control item to the host when any action control item is selected for making the host perform the corresponded action control.

2. The external display system of claim 1, wherein computer module is a desktop computer or a notebook computer.

3. The external display system of claim 1, wherein the second USB connection port is electrically coupled with the second USB transmission interface unit.

4. The external display system of claim 1, wherein the switch unit at least comprises a left button, a right button and a wheel.

5. The external display system of claim 1, wherein the storage unit is an Electrically-Erasable Programmable Read-Only Memory (EEPROM) or a Flash Memory.

6. The external display system of claim 1, wherein the display unit is a LCD.

7. The external display system of claim 1, wherein the external display module further comprises a scaler electrically coupled the microprocessor and the display unit, the scaler transforms the status video data to a display format data corresponded to a display format of the display unit and transfers the display format data to the display unit for displaying.

8. The external display system of claim 7, wherein the display format data conforms to the standard of LVDS (Low-Voltage Differential Signaling).

9. The external display system of claim 1, wherein the status non-video data comprises a data of a key press count, a wheel roll count, an usage time length of the mouse module.

10. The external display system of claim 1, wherein the setting non-video data comprises the operation key settings of a computer games or a software, the default parameters of the mouse module or the keyboard, or the parameter setting values of the sensors.

* * * * *